Jan. 10, 1928.

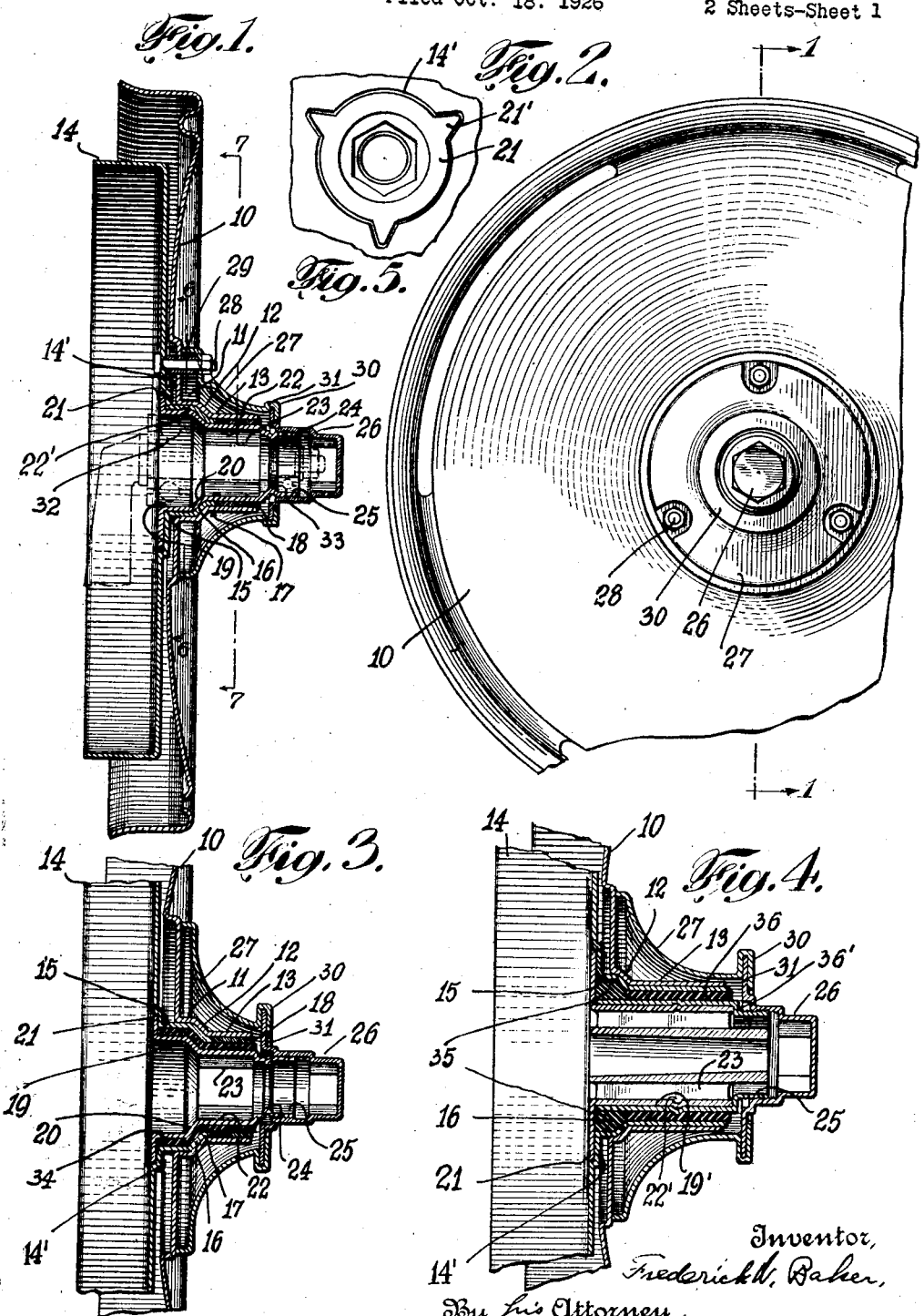

F. W. BAKER 1,655,807

BRAKE DRUM AND WHEEL CONSTRUCTION

Filed Oct. 18, 1926

Inventor
Frederick W. Baker

By
Ramsay Hoguet,
Attorney

Patented Jan. 10, 1928.

1,655,807

UNITED STATES PATENT OFFICE.

FREDERICK WILLIAM BAKER, OF OLDSWINFORD, STOURBRIDGE, ENGLAND, ASSIGNOR TO TRINITY WHEEL CORPORATION, OF NEW YORK, N. Y., A CORPORATION OF NEW YORK.

BRAKE DRUM AND WHEEL CONSTRUCTION.

Application filed October 18, 1926. Serial No. 142,324.

My invention relates to improvements in vehicle wheels, and more particularly to vehicle wheels which are used in combination with a brake drum, and especially wheels which are adapted for use on motor cars. The invention is intended to simplify, strengthen and cheapen wheels of this character, and particularly the connection between the wheel and drum member. The invention is also intended as an improvement on the structure disclosed in my application for Letters Patent of the United States, Serial No. 134,063, filed September 7th, 1926. Like the other invention this improvement has coacting members merging into a common hub, and with the hub portions lying one within the other. In the prior invention referred to, the hub member of the drum is extended so as to project through and beyond the axial flange member of the wheel, and the two hub portions have coacting parts adapted to hold them against relative rotation. In my prior construction referred to, however, this prolongation of the hub member of the drum is a little difficult and requires enough metal so that it may necessitate the thickening of the drum metal to avoid difficulties in drawing or pressing.

My present invention is intended to make this connection easier and simpler, and to accomplish this I make the hub member of the drum relatively short so that it can be easily pressed, stamped, or otherwise formed without unduly extending the metal, and it coacts with the wheel flange for only a part of the length of the latter. To compensate for this I employ a metallic ring which coacts with the wheel flange and acts virtually as an extension of the drum hub, and then to complete the hub structure and to lock the parts together, I use a complementary key member which forms the inner core of the hub and extends through the drum and beyond both the drum hub and the wheel flange to form a connecting medium with the wheel nut. This makes the structure simpler and easier to manufacture, and at the same time preserves the characteristics of the wheel of my prior application referred to. The result of the structure is a wheel and drum having a common hub united in a simple way to prevent any shearing action or undue strain, and also to prevent any relative movement either axially or circumferentially of the meeting and coacting parts. My improved structure also provides for a resilient driving connection between the adjacent and coacting members so as to further relieve the shock and strain incident to the driving action. All of which will be better understood from the description which follows.

Reference is to be had to the accompanying drawings forming a part of this specification, in which similar reference characters indicate corresponding parts in all the views.

Figure 1 is a vertical section of my improved wheel structure on the line 1—1 of Figure 2.

Figure 2 is a broken side elevation of the wheel.

Figure 3 is a cross section through the hub of the wheel showing slight modifications from the structure shown in Figure 1.

Figure 4 is a view similar to Figure 3 but showing other slight modifications.

Figure 5 is a broken detail of the connection between the brake drum and locking member.

Figure 6:
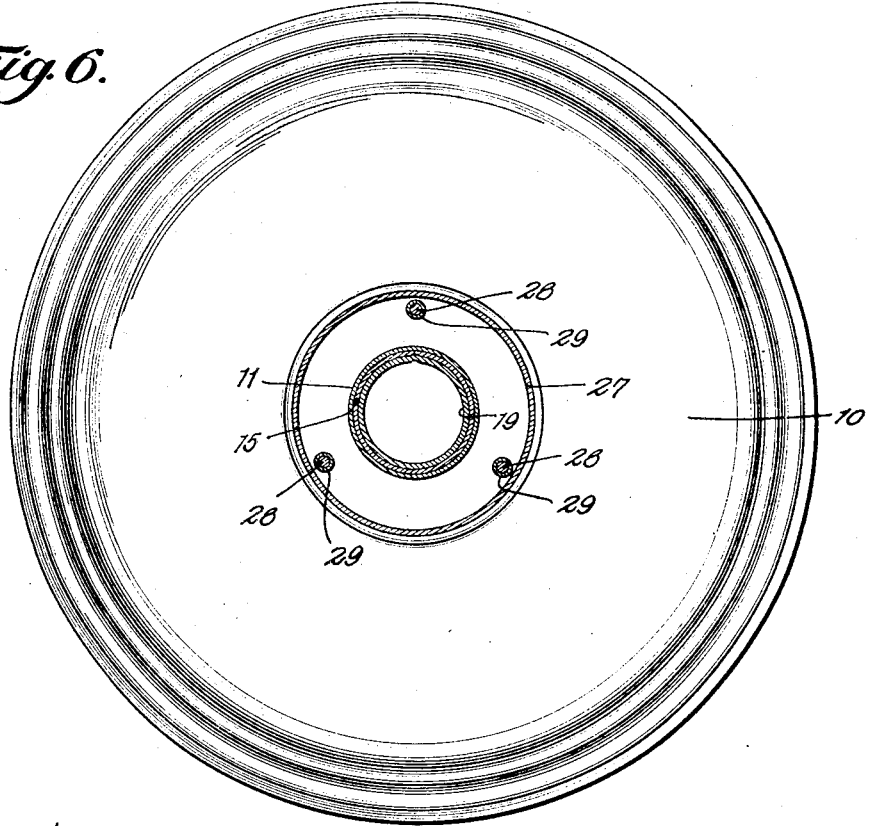
Fig. 6 is a cross section on the line 6—6 of Fig. 1.

The wheel 10 so far as the invention is concerned, may be of any approved type of wheel, and it has an axial flange 11, provided with a shoulder 12, and with a reduced portion 13. The drum 14 can be any approved type of drum, but is preferably a metalllic drum which enables the hub portion 15 to be pressed or punched from it, and this is adapted to extend within the flange 11 of the wheel member. It has a shoulder 16 corresponding and complementary to the corresponding part of the wheel flange, and the hub terminates in a short reduced section 17 which is shown as entering the corresponding reduced part 13 of the wheel flange. By shortening up this hub member 15 it is easy to produce it, and it might be still further shortened if desired without affecting the invention. These parts 11 and 15 at their portions 13 and 17 where they meet are facetted see Fig. 7 of the drawings or otherwise shaped so that they will fit snugly together but will be held against relative rotation, and they might be so held in other ways without affecting the invention. This feature is shown in my prior application above referred to.

Figure 7:
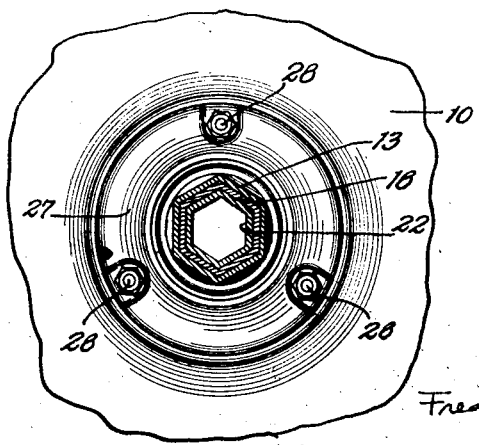
Fig. 7 is a cross section on the line 7—7 of Fig. 1.

To complete the coacting connection between the hub members of the wheel and drum, I employ a ring 18 which extends from the end 17 of the drum hub to approximately the end of the wheel flange portion 13, and which is of the same cross sectional shape as the said part 13, see Fig. 7, so that the two parts cannot turn with relation to each other.

To complete the hub and lock the central portion in fixed position, I employ a hollow key member 19 which is of the same cross sectional shape as its complementary parts, that is the wheel, flange and drum hub, and this has a flange 21 at its inner end to limit its movement, a shoulder 20 corresponding to the shoulders 12 and 16 of the wheel flange and hub members, a part 22 fitting within and coacting with the ring 18, and also fitting the axial spider 23. This key member 19 has also the conventional inturned shoulder 24 to assist in fixing the position of the outer ball bearing 33 hereinafter referred to and the threaded extension 25 to which the nut or cap 26 screws.

The flange 21 of the member 19 lies in a countersink 14' of the body of the drum 14 and as a further guard against turning the flange has offset portions 21' lying in complementary parts of the countersink 14' and thus the flange 21 lies flush with the inner wall of the brake drum. To still further guard against the relative turning of the member 19 and its coacting parts, the meeting parts may be indented as at 22' in Figure 4.

The connection between the cap 26 and the cover flange 27 is substantially as shown in my prior application. This cover flange 27 is to assist in bracing the wheel and to give it a handsome appearance. It fits against the wheel body, and the cover flange, wheel 10, and drum 14 are all connected together by spaced bolts 28 which extend through spacing sleeves 29. At its outer end the cover flange has an inturned end 30 within which fits the flange 31 of the cap or nut 26, thus affording a locking connection but permitting the rotation of the flange 31 with reference to the cover flange. As in the prior case the shoulders 12, 16 and 20 act as a single shoulder to provide space for the inner ball bearing 32 of the axle and act as a single unit and also prevent longitudinal movement in one direction, and the shoulder 24 of the inner hub member fits against the race rings of the outer ball bearing 33.

To relieve the shock and strain incident to imparting driving force to the wheel from the axle, I can insert a resilient packing 34 which can be rubberized fabric or other tough resilient material, between the key member 19 and the complementary parts 15 and 18 of the hub, as shown clearly in Figure 3.

In Figure 4 I have shown a slight modification to illustrate more particularly the fact that the resilient driving connection can be accomplished in various ways, and that the locking or key member of the hub can be given various shapes without affecting the invention. This form is adapted for use on the front axle of a car. As here shown the locking or key member 19' has a body portion shaped to fit the spider 23 for substantially the whole length of the said member, leaving a space between the part 15 and the body of the key member for the packing 35, while the packing 36 can be placed between the key member and the outer portion of the drum hub 15. In this instance the drum hub is prolonged somewhat as shown, and the ring 18 is not used, but the hub is not prolonged to the extent of making it difficult to make, and it does not form a connection with the nut or cap. In this structure the key member 19' has a shoulder 36' overlapping the outer end of the axle spider 23 and the threaded part 25 connecting with the cap 26 as already described. In Figure 4 it will be seen that the ball bearings are not illustrated.

Thus it will appear that I show a very simple, inexpensive and unusually strong wheel and drum structure, in which very few bolts are used, in which the tendency to shear the connection is eliminated, and in which a strong and if desired resilient junction of the parts is preserved.

It will be understood that this invention can be best adapted to wheels in which both the drum body, and adjacent wheel part are made of metal which can be pressed, shaped or stamped so that the coacting hub portions will be integral with the bodies of the wheel and drum in order that they may telescope one into the other without difficulty, and will unite to form a common hub portion which is completed by the locking or key member 19.

I claim:—

1. As an improved article of manufacture, a brake drum and wheel having a common hub, and a key member extending through the hub and interlocking therewith.

2. A brake drum and wheel having complementary parts telescoping at the hub, and a nut engaging key member extending through the hub.

3. A brake drum and wheel having complementary parts telescoping at the hub and held against relative rotation, and a key member extending through said complementary parts to complete the hub.

4. A brake drum and wheel having parts lying one within the other at the hub, with complementary flattened portions to prevent relative rotation of said parts, and a nut engaging key member of similar cross sectional shape extending through and coacting with the hub portions of the wheel and drum.

5. A brake drum and wheel having coacting parts fitting one within the other at the hub, and a complementary key member fitting within said parts to complete the hub.

6. A brake drum and wheel having coacting parts fitting one within the other at the hub and shaped to prevent relative rotation, and a complementary key member extending through said parts.

7. A brake drum and wheel having coacting parts fitting one within the other at the hub and shape to prevent relative rotation, and a complementary key member extending through and coacting with said parts, said key member having its outer end prolonged to form a nut connection.

8. A structure of the kind described comprising a wheel having an axially extending hub flange, a drum having a relatively short hub fitting against and within the wheel flange, a ring within the wheel flange at the end of the drum hub, the ring, drum hub and wheel flange being held against relative rotation, and a key member fitting within and extending through the drum hub and the aforesaid ring, said key member coacting with the wheel flange, drum hub and ring so as to turn as a unit therewith, and means at the outer end of the key member for the attachment of a nut.

9. A structure of the kind described comprising a wheel having an axial flange at the hub portion, a brake drum having a hub extending into the flange of the wheel and fitted thereto so as to prevent relative rotation of the coacting parts, a key member extending through the hub of the drum and shaped to turn as a unit with the drum hub and wheel flange, and a resilient member between the key member and the drum hub.

10. A brake drum and wheel having similar inturned hub portions fitting one within the other in close contact for at least a part of their length and shaped to prevent relative rotation.

In testimony whereof, I have signed my name to this specification this 14th day of October 1926.

FREDERICK WILLIAM BAKER.